(12) United States Patent
Czaplicki et al.

(10) Patent No.: US 7,077,460 B2
(45) Date of Patent: Jul. 18, 2006

(54) REINFORCEMENT SYSTEM UTILIZING A HOLLOW CARRIER

(75) Inventors: Michael J. Czaplicki, Rochester, MI (US); Jon Riley, Farmington, MI (US)

(73) Assignee: L&L Products, Inc., Romeo, MI (US)

( * ) Notice: Subject to any disclaimer, the term of this patent is extended or adjusted under 35 U.S.C. 154(b) by 101 days.

(21) Appl. No.: 10/423,801

(22) Filed: Apr. 25, 2003

(65) Prior Publication Data

US 2003/0184121 A1  Oct. 2, 2003

Related U.S. Application Data

(60) Provisional application No. 60/377,126, filed on Apr. 30, 2002.

(51) Int. Cl.
*B60J 7/00* (2006.01)

(52) U.S. Cl. .......................... 296/187.02; 296/187.12; 296/203.03; 52/735.1

(58) Field of Classification Search ........... 296/187.01, 296/187.02, 187.12, 203.03; 52/309.4, 309.5, 52/309.8, 735.1
See application file for complete search history.

(56) References Cited

U.S. PATENT DOCUMENTS

| | | |
|---|---|---|
| 1,814,677 A | 7/1931 | Fennema |
| 3,162,086 A | 12/1964 | Wells |
| 3,649,375 A | 3/1972 | Venkatesan |
| 4,029,128 A | 6/1977 | Yamagishi |
| 4,269,890 A | 5/1981 | Breitling et al. |
| 4,399,174 A | 8/1983 | Tananka et al. |
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |
| 4,861,097 A | 8/1989 | Wycech |
| 4,922,596 A | 5/1990 | Wycech |

(Continued)

FOREIGN PATENT DOCUMENTS

CA  913319  10/1972

(Continued)

OTHER PUBLICATIONS

Copending U.S. Appl. No. 09/459,756 filed Dec. 10, 1999.

(Continued)

*Primary Examiner*—Joseph D. Pape
(74) *Attorney, Agent, or Firm*—Dobrusin & Thennisch, PC (57) ABSTRACT

A system and method for reinforcing at least a portion of a structural member, including at least one hollow carrier, having an exterior shell and an interior portion, which substantially conforms to the dimensions and geometry of the structural member being reinforced; and a lightweight, low density material for filling the interior portion of one or more of the carriers. The material filling one or more of the carriers of the present invention can be a reinforcement material, self-curing material, or a heat activated expandable material. The carrier can be produced by blow molding or rotational molding and has an adhesive material disposed along at least a portion of the exterior shell used to place, adhere, and affix the carrier to a targeted portion of the structural member selected to be structurally reinforced.

17 Claims, 2 Drawing Sheets

U.S. PATENT DOCUMENTS

| | | |
|---|---|---|
| 4,923,902 A | 5/1990 | Wycech |
| 4,978,562 A | 12/1990 | Wycech |
| 4,984,406 A | 1/1991 | Friesen |
| 5,072,952 A | 12/1991 | Irrgeher et al. |
| 5,102,188 A | 4/1992 | Yamane |
| 5,124,186 A | 6/1992 | Wycech |
| 5,160,465 A | 11/1992 | Soderberg |
| 5,358,397 A | 10/1994 | Ligon et al. |
| 5,474,721 A | 12/1995 | Stevens |
| 5,506,025 A | 4/1996 | Otto et al. |
| 5,529,824 A | 6/1996 | Walendy et al. |
| 5,631,027 A | 5/1997 | Takabatake |
| 5,642,914 A | 7/1997 | Takabatake |
| 5,660,116 A | 8/1997 | Dannawi et al. |
| 5,725,272 A | 3/1998 | Jones |
| 5,755,486 A | 5/1998 | Wycech |
| 5,766,719 A | 6/1998 | Rimkus |
| 5,806,919 A | 9/1998 | Davies |
| 5,851,626 A | 12/1998 | McCorry et al. |
| 5,878,784 A | 3/1999 | Sales et al. |
| 5,884,960 A | 3/1999 | Wycech |
| 5,888,600 A | 3/1999 | Wycech |
| 5,931,474 A | 8/1999 | Chang et al. |
| 5,937,486 A | 8/1999 | Bockenheimer |
| 5,985,435 A | 11/1999 | Czaplicki et al. |
| 5,992,923 A | 11/1999 | Wycech |
| 6,000,612 A | 12/1999 | Xu |
| 6,003,274 A | 12/1999 | Wycech |
| 6,006,484 A | 12/1999 | Geissbuhler |
| 6,033,300 A | 3/2000 | Schneider |
| 6,040,350 A | 3/2000 | Fukui |
| 6,053,210 A | 4/2000 | Chapman et al. |
| 6,068,424 A | 5/2000 | Wycech |
| 6,079,180 A | 6/2000 | Wycech |
| 6,092,864 A | 7/2000 | Wycech et al. |
| 6,093,358 A | 7/2000 | Schiewe et al. |
| 6,096,403 A | 8/2000 | Wycech |
| 6,099,948 A | 8/2000 | Paver, Jr. |
| 6,103,341 A | 8/2000 | Barz et al. |
| 6,131,897 A | 10/2000 | Barz et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,244,601 B1 | 6/2001 | Buchholz et al. |
| 6,247,287 B1 | 6/2001 | Takabatake |
| 6,253,524 B1 | 7/2001 | Hopton et al. |
| 6,254,488 B1 | 7/2001 | Hill |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,214 B1 | 10/2001 | Rhoads |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,378,933 B1 | 4/2002 | Schoen et al. |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,403,692 B1 | 6/2002 | Traugott et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B1 | 11/2002 | Barz |
| 6,474,723 B1 | 11/2002 | Czaplicki et al. |
| 6,475,577 B1 | 11/2002 | Hopton et al. |
| 6,478,367 B1 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B1 | 1/2003 | Schneider |
| 6,519,854 B1 | 2/2003 | Blank |
| 6,523,857 B1 | 2/2003 | Hopton et al. |
| 6,523,884 B1 | 2/2003 | Czaplicki et al. |
| 6,546,693 B1 | 4/2003 | Wycech |
| 6,550,847 B1 | 4/2003 | Honda et al. |
| 6,561,571 B1 | 5/2003 | Brennecke |
| 6,573,309 B1 | 6/2003 | Reitenbach et al. |
| 6,575,526 B1 | 6/2003 | Czaplicki et al. |
| 6,607,238 B1 | 8/2003 | Barz |
| 6,619,727 B1 | 9/2003 | Barz et al. |
| 6,634,698 B1 | 10/2003 | Kleino |
| 6,641,208 B1 | 11/2003 | Czaplicki et al. |
| 6,668,457 B1 | 12/2003 | Czaplicki et al. |
| 6,691,468 B1 | 2/2004 | Helferty |
| 6,692,347 B1 | 2/2004 | Schneider |
| 6,708,979 B1 | 3/2004 | Stratman et al. |
| 6,729,425 B1 | 5/2004 | Schneider |
| 6,748,667 B1 | 6/2004 | Sevastian |
| 6,777,049 B1 | 8/2004 | Sheldon et al. |
| 6,786,533 B1 | 9/2004 | Bock et al. |
| 6,793,274 B1 | 9/2004 | Riley et al. |
| 6,811,864 B1 | 11/2004 | Czaplicki et al. |
| 6,820,923 B1 | 11/2004 | Bock |
| 6,846,559 B1 | 1/2005 | Czaplicki et al. |
| 6,851,232 B1 | 2/2005 | Schwegler |
| 6,855,652 B1 | 2/2005 | Hable et al. |
| 6,890,021 B1 | 5/2005 | Bock et al. |
| 2001/0042353 A1 | 11/2001 | Honda et al. |
| 2002/0024233 A1 | 2/2002 | Kleino |
| 2002/0053179 A1 | 5/2002 | Wycech |
| 2002/0066254 A1 | 6/2002 | Ebbinghaus |
| 2002/0074827 A1 | 6/2002 | Fitzgerald et al. |
| 2003/0001469 A1 | 1/2003 | Hankins et al. |
| 2003/0039792 A1 | 2/2003 | Hable et al. |
| 2003/0042056 A1 | 3/2003 | Schneider et al. |
| 2003/0052516 A1 | 3/2003 | Czaplicki et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0090129 A1 | 5/2003 | Riley et al. |
| 2004/0011282 A1 | 1/2004 | Myers et al. |
| 2004/0074150 A1 | 4/2004 | Wycech |
| 2004/0079478 A1 | 4/2004 | Merz |
| 2004/0135058 A1 | 7/2004 | Wycech |
| 2005/0058787 A1 | 3/2005 | Ishikawa et al. |
| 2005/0081383 A1 | 4/2005 | Kosal et al. |
| 2005/0082111 A1 | 4/2005 | Weber |
| 2005/0102815 A1 | 5/2005 | Larsen |

FOREIGN PATENT DOCUMENTS

| | | |
|---|---|---|
| DE | 29 19 046 | 11/1980 |
| DE | 3826011 A1 | 2/1990 |
| DE | 38 38 655 A1 | 5/1990 |
| DE | 40 28 895 C1 | 2/1992 |
| DE | 42 27 393 A1 | 3/1993 |
| DE | 196 35 734 A1 | 4/1997 |
| DE | 196 48 164 A1 | 5/1998 |
| DE | 197 03 429 A1 | 8/1998 |
| DE | 198 12 288 C1 | 5/1999 |
| DE | 198 56 255 C1 | 1/2000 |
| DE | 198 58 903 A1 | 6/2000 |
| EP | 0 414 302 A1 | 2/1991 |
| EP | 0 679 501 A1 | 11/1995 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| EP | 1 134 126 B1 | 3/2001 |
| EP | 1 122 156 A2 | 8/2001 |
| EP | 0 893 332 B1 | 3/2002 |
| EP | 1 208 954 A2 | 5/2002 |
| EP | 1 256 512 A2 | 11/2002 |
| EP | 1 362 683 A2 | 11/2003 |
| EP | 1 362 769 A1 | 11/2003 |
| EP | 1 428 744 | 6/2004 |
| EP | 1 475 295 A2 | 11/2004 |
| FR | 2115177 | 7/1972 |
| FR | 2 749 263 | 12/1997 |
| GB | 2 083 162 A | 5/1982 |
| GB | 2 156 412 A | 10/1985 |
| GB | 2 375 328 A | 11/2002 |
| JP | 58-87668 | 6/1983 |
| JP | 59-214628 | 12/1984 |
| JP | 61-205109 | 9/1986 |
| JP | 63-231913 | 9/1988 |
| JP | 01069308 | 3/1989 |
| JP | 01164867 | 6/1989 |
| JP | 02206537 | 8/1990 |
| JP | 3-197743 | 8/1991 |
| JP | 4-158009 | 6/1992 |
| JP | 7-117728 | 5/1995 |
| JP | 7-31569 | 6/1995 |
| JP | 02001191949 A | 7/2001 |
| WO | WO 87/01978 | 4/1987 |
| WO | WO 93/05103 | 3/1993 |
| WO | WO 93/32110 | 11/1995 |
| WO | WO 97/02967 | 1/1997 |
| WO | WO 97/43501 | 11/1997 |
| WO | WO 98/36944 | 8/1998 |
| WO | WO 98/50221 | 11/1998 |
| WO | WO 99/08854 | 2/1999 |
| WO | WO 99/28575 | 6/1999 |
| WO | WO 99/36243 | 7/1999 |
| WO | WO 99/48746 | 9/1999 |
| WO | WO 99/50057 | 10/1999 |
| WO | WO 99/64287 | 12/1999 |
| WO | WO 00/02747 | 1/2000 |
| WO | WO 00/13958 | 3/2000 |
| WO | WO 00/37239 | 6/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/71225 A1 | 7/2001 |
| WO | WO 01/54936 A1 | 8/2001 |
| WO | WO 01/83206 A1 | 11/2001 |
| WO | WO 01/88033 A1 | 11/2001 |
| WO | WO 02/36531 A2 | 5/2002 |
| WO | WO 03/042024 A1 | 5/2003 |
| WO | WO 03/047951 A1 | 6/2003 |
| WO | WO 03/051676 | 6/2003 |
| WO | WO 03/078163 A1 | 9/2003 |
| WO | WO 03/089221 A1 | 10/2003 |
| WO | WO 03/093387 | 11/2003 |
| WO | WO 03/095575 A2 | 11/2003 |
| WO | WO 05/007720 A1 | 1/2005 |

OTHER PUBLICATIONS

Copending U.S. Appl. No. 09/631,211 filed Aug. 3, 2000.
Copending U.S. Appl. No. 09/655,965 filed Sep. 6, 2000.
Copending U.S. Appl. No. 10/233,919 filed Sep. 3, 2002.
Copending U.S. Appl. No. 10/103,029 filed Mar. 21, 2002.
Copending U.S. Appl. No. 10/008,194 filed Nov. 8, 2001.
Copending U.S. Appl. No. 10/008,505 filed Nov. 8, 2001.
Copending U.S. Appl. No. 10/098,952 filed Mar. 15, 2002.
Copending U.S. Appl. No. 10/386,287 filed Mar. 11, 2003.
Copending U.S. Appl. No. 10/339,112 filed Jan. 9, 2003.
Copending U.S. Appl. No. 10/342,025 filed Jan. 14, 2003.
Copending U.S. Appl. No. 10/337,446 filed Jan. 7, 2003.
Copending European Application Serial No. 0130439.3 filed Dec. 20, 2001.
Copending U.S. Appl. No. 10/404,831 filed Apr. 1, 2003.
Copending U.S. Appl. No. 09/923,138 filed Aug. 6, 2001.
Copending U.S. Appl. No. 10/133,898 filed Apr. 26, 2002.
Copending U.S. Appl. No. 10/216,944 filed Aug. 12, 2002.
Born et al., Structural Bonding in Automotive Applications.

REINFORCEMENT SYSTEM UTILIZING A HOLLOW CARRIER

CLAIM OF BENEFIT OF FILING DATE

The present application claims the benefit of the filing date of U.S. Provisional Application Ser. No. 60/377,126 (filed Apr. 30, 2002), hereby incorporated by reference.

FIELD OF THE INVENTION

The present invention relates to a hollow carrier reinforcement system wherein the hollow carrier can receive and retain a volume of fill material for reinforcing a portion of a structural member. More particularly, the present invention relates to a hollow carrier produced by blow molding, rotational molding or other method to produce a hollow structure suitable for retaining a rigid material, preferably of low density, for placement within a structural member. The system comprises a least one hollow carrier suitable for receiving and retaining a rigid material such as foamed polyurethane, epoxy, thermoplastic, ceramic, metallic, metallic foam, concrete, or other material which may provide structural reinforcement, noise and vibration damping, sealing, stress-strain reduction, or other desired physical characteristics to the structural member, as well as any combination of the foregoing.

BACKGROUND OF THE INVENTION

Prior art methods and systems used for reinforcing a portion of a structural member utilize either a foamable material placed in contact with the selected structural member or a combination carrier and foamable material, which can be placed or attached to targeted portions of a structural member to achieve structural reinforcement and enhance structural rigidity. Although such prior art methods and systems work well and are advantageous in many applications, the structural nature, weight, or cost of the carrier may limit the effectiveness for which the system could be used. For instance, the structure, location, and geometric volume of the structural member being reinforced can make it difficult or place constraints on the ability to insert a carrier. In addition, the weight of the carrier itself may cause additional issues of economic efficiencies in the manufacturing process, particularly when used to reinforce structural members having large interior volumes, such as an automotive frame or rail member. Thus, this method provides an alternative system and method that will provide structural reinforcement utilizing lightweight reinforcement components which can be introduced to the vehicle at various stages throughout the manufacturing or assembly process concerning the member being reinforced.

The present invention obviates and overcomes the drawbacks found in the prior art by providing a hollow carrier that is formed through either a blow molding, rotational molding, or other processes to create a hollow structure that fit within the contours of an inner portion of the chosen structural member upon insertion into the structural member. The system may comprise one or more carriers that can be filled with a rigid, low density material specifically selected for characteristics that include reduced weight and reinforcement capabilities in addition to low overall cost. The hollow carrier, although preferably rigid, can also be flexible and has an inner volume having a variety of geometric dimensions and expansion volumes. The hollow carrier is suitable and capable of receiving a variety of materials, which may or may not be expandable or heat-activatable, that can be pumped, placed, pellet-fed, extruded, retained, or otherwise disposed within the carrier for structural reinforcement, damping, and/or sealing of the member without allowing unwanted spillage or leakage of the material to portions of the structural member such as tooling holes and other hardware needed in the manufacturing process. It should be understood that in certain applications filling is not necessary. The carrier is further defined by an exterior shell or surface, which can be placed directly into contact with the selected portion of the structural member targeted for reinforcement. A heat-activated structural material, psa, bonding agent, or other adhering material is applied to at least a portion of the exterior shell or surface of the carrier to bond and adhere the now filled carrier in place to the structural member during exposure to the cure ovens and other operations typically encountered in an automotive manufacturing facility.

SUMMARY OF THE INVENTION

The present invention is directed to a filled hollow carrier reinforcement system for use within selected portions of a structural member to effectuate structural reinforcement, noise and vibration damping, and/or sealing without interfering with or comprising other portions of the member or the manufacturing assembly process. The system includes at least one hollow carrier, having an interior portion, which may receive and retains a volume of rigid material, preferably a low density material, which may receive in the form of a solid, liquid, pelletized, foam, foamable, or any combination thereof, preferably lightweight material suitable for providing structural reinforcement to at least a portion of the structural member. The carrier or plurality of carriers of the present invention may be produced by either blow molding, rotational molding and thermoplastic materials such as nylon, polypropylene, polysulphone, etc. utilizing to form either a box-like carrier of any desired geometric shape, form, or dimension having an exterior shell or surface defining a inner volumetric space suitable for receiving and retaining an amount of rigid material for lightweight reinforcement of the selected structural member. It is further contemplated that the carrier can be formed into a hollow structure by a machine or tool to conform and shape to the pre-defined dimensions and contours of an inner portion of the chosen structural member. The carrier may comprise a polymeric material, such as nylon, an injection molded polymer, graphite, carbon, or a molded metal such as aluminum, magnesium, or titanium as well as an alloy derived from the materials or a foam derived from the materials or other metallic foam.

The material disposed, placed, filled, extruded, or pumped into the carrier disclosed in the present invention is preferably a rigid, low density material such as foamed polyurethane, epoxy, thermoplastic, ceramic, metallic, metallic foam, foamed concrete, or other material which may harden by curing, cooling, or some other method to produce a preferably lightweight, but rigid, interior defined within the inner portion of the carrier. It is contemplated that the use of lightweight reinforcing materials, such as polyurethane foams, may allow distortion without encapsulation within the hollow carrier. Further, the selected material may be in pelletized form or other loose material that can fuse together when exposed to heat encountered in the manufacturing process to create the interior reinforcement within the hollow carrier. In addition, any number of materials may be selected for placement within the interior portion of the hollow carrier. Such materials may be cured at ambient temperatures found in a standard manufacturing environment, may be a self-curing material with or without a resulting exothermic reaction, may be capable of chemical activation depending upon application parameters, or may capable of expansion from 0–2000% when exposed to heat typically encountered in an automotive paint operation, such as e-coat and other paint cycles in a vehicle assembly plant. Although the selected material need not be foamable or expandable, in one embodiment the material is heat expandable and at least partially fills the carrier. In another embodiment, the material is a melt flowable material, which upon the application of heat will spread within the interior of the hollow carrier or otherwise occupy the volume of the carrier. The selected material may also provide a variety of characteristics including structural reinforcement, stress-strain reduction, vibrational damping, noise reduction, or any combination thereof. However, it is contemplated that the material of the present invention need not be either expandable or heat-activatable, and may consist of an ambient temperature-curing material, which reacts with or without an exothermic response to fill the volume of the hollow carrier and reinforce the chosen structural member. Once filled with the selected material, a heat activated structural material, psa, bonding material, or other adhering material is applied to at least a portion of the exterior shell or surface of the filler or unfilled hollow carrier to bond the carrier in place to the selected structural member during the manufacturing process and exposure to paint ovens.

In yet another embodiment, the present invention further serves to reduce health, cleanliness, and maintenance issues encountered through the use of "wet" chemical technology in either a pre-assembly facility or a vehicle assembly plant since the material can be extruded, molded, placed, or filled, or "mini-application" bonded directly into the at least one carrier in either a pre-production setting, such as a stamping facility, or during the final assembly operation. The carrier, and the material, can be installed or placed into an inner portion of the selected structural member prior to the e-coat or paint operation processing. Hence, the present invention provides flexibility in the manufacturing process since it can be utilized by either the manufacturer/supplier of the structural member, such as the frame, rail, pillar, or door assembly, or the final vehicle manufacturer with reduced labor, capital expense, maintenance requirements, and floor space demand. Once the material bonds and/or cures within the carrier within the inner portion of the structural members, distortion of the structural member may be inhibited or managed during an impact event or any other application of force to the vehicle structure.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

The hollow carrier reinforcement system of the present invention generally includes at least one carrier defined by an exterior shell and an interior or inner hollow cavity. This cavity may be filled with a lightweight and low density material retained by or disposed within at least a portion of the interior hollow cavity, and a bonding material disposed along at least a portion of the exterior shell of the carrier to retain the potentially filled hollow carrier in place to the selected structural member chosen for structural reinforcement. In general application, the system can be used to reinforce a portion of a structural member of automotive, aerospace, and marine vehicles, such as an automotive frame or rail member, having either an open or closed center by blow molding, rotational molding, or other method to produce a hollow structure carrier, or a plurality of carriers, within the interior or along an inner portion of the structure or structural member to be reinforced. At least one carrier may be a solid structure for formed placement within the inner portion of a structural member or a flexible carrier capable of volumetric expansion, which will generally come into contact with, and conform and shape to the geometry and dimensions of, the inner portion of the structural member.

In a particular preferred embodiment, the carrier is a blow-molded or rotational molded structure having an exterior shell and interior or inner hollow portion, which can be configured in any shape, design, or thickness corresponding to the dimensions of the chosen structural member to be reinforced. Once the carrier is formed for placement within the structural member through physical placement, gravity placement, sealing material, adhesive material, mechanical retention means (e.g., a fastener or otherwise, such as fastener 48 shown in FIG. 1), or otherwise attached, affixed, or adhered to the structural member, a material having preferably lightweight and low-density characteristics, such as a polymer-based liquid, solid, semi-solid, or pelletized material, may be received, filled, or disposed into the interior or inner hollow cavity of the hole or port extending through the exterior portion or membrane of the compartment or chamber. It should be appreciated that one or more mechanical retention means (via one or more fastener 48 or otherwise), may be configured for placement, locating and/or securing of the carrier 12 within the structural member 16. It is also contemplated that the material of the present invention can be filled or otherwise disposed into the compartment or chamber, such as a blow-molded receptacle, prior to placement within the selected structural member. Examples of material which can be utilized to fill the chamber or compartment of the present invention may include rigid, low density materials such as aluminum or other metallic foam, including alloys or composites thereof, concrete, foamed polyurethane, epoxy, thermoplastic, ceramic, metallic, metallic foam, or other material which may harden by curing, cooling, or some other method to produce a preferably lightweight, but rigid, interior defined within the interior or inner hollow cavity of the carrier. In one embodiment, the carrier of the present invention consists of a blow-molded structure having an interior portion suitable for receiving the material which can be placed within the blowmolded structure either before or after insertion and placement within the chosen structural member. It is contemplated that the carrier would also have an exterior shell or portion suitable for receiving an application of sealant, bonding, or adhesive material so that the carrier adheres and affixes to a selected portion of the chosen structural member targeted for reinforcement.

It is contemplated that the carrier could comprise a polyamide (e.g., nylon), poly sulfone, or other polymeric material as set forth in commonly owned U.S. Pat. No. 6,103,341, expressly incorporated by reference herein, as well as injection molded, extruded, blow-molded, reaction injection molded, die cast, or machined chamber comprising materials such as nylon, PBI, or PEI. The carrier may also be selected from materials consisting of extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC and may be further utilized with a sealant or adhesive disposed along an exterior portion of the compartment or chamber so that the compartment or chamber adheres to the chosen structural member and remains in a designated position In a non-limiting embodiment, the system of the present invention can be used to reinforce a portion of a structural member having a hollow center. Alternatively, the present invention can be utilized to reinforce selected portions of a chosen structural member which may or may not have a hollow center.

The system 10 includes at least one carrier 12 that is produced by blow molding or rotational molding having an exterior shell or surface 20 and an interior or inner hollow cavity 22 suitable for receiving a low density reinforcement material 14 that is disposed, filled, pumped, or placed within the inner hollow cavity 22 of the carrier 12.

Figure 1:
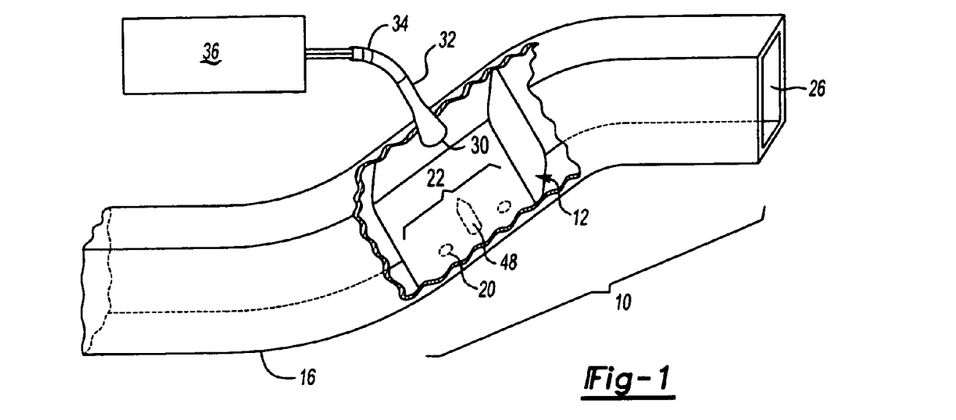
FIG. 1 is a cross-section showing the hollow carrier system formed in accordance with the teachings of this invention.

Turing now to the embodiment shown in FIG. 1, the carrier 12 can be a solid structure, such as a rigid box-like compartment, produced by blow molding or rotational molding having an exterior surface or shell 20, an interior portion or hollow cavity 22 with a defined volume, that can be formed and shaped to conform with the geometric dimensions of the structural member 16 selected for reinforcement. In the embodiment of FIG. 1, the carrier 12 includes an interior hollow cavity which occupies a volume or space within a hollow portion 26 of the structural member 16 to be reinforced. The carrier 12 may have a porous, flexible, solid, or rigid outer membrane or exterior shell 20. The exterior surface or shell 20 permits the carrier 12 to conform to the shape of the area being reinforced as defined by the dimensions of the structural member 16. The carrier 12 can also include at least one access hole or port 30 for the ingress, intake, or introduction of a material 14, such as a lightweight low density material, which may be self-curing or an expandable material, into the interior hollow cavity 22 of the carrier 12. The system of the present invention may further utilize an integral neck portion 32 having an end portion 34 for coupling the carrier 12 to an outside filling apparatus 36 for filling an amount of material 14 into the interior hollow cavity 22 of the carrier 12.

Figure 2:
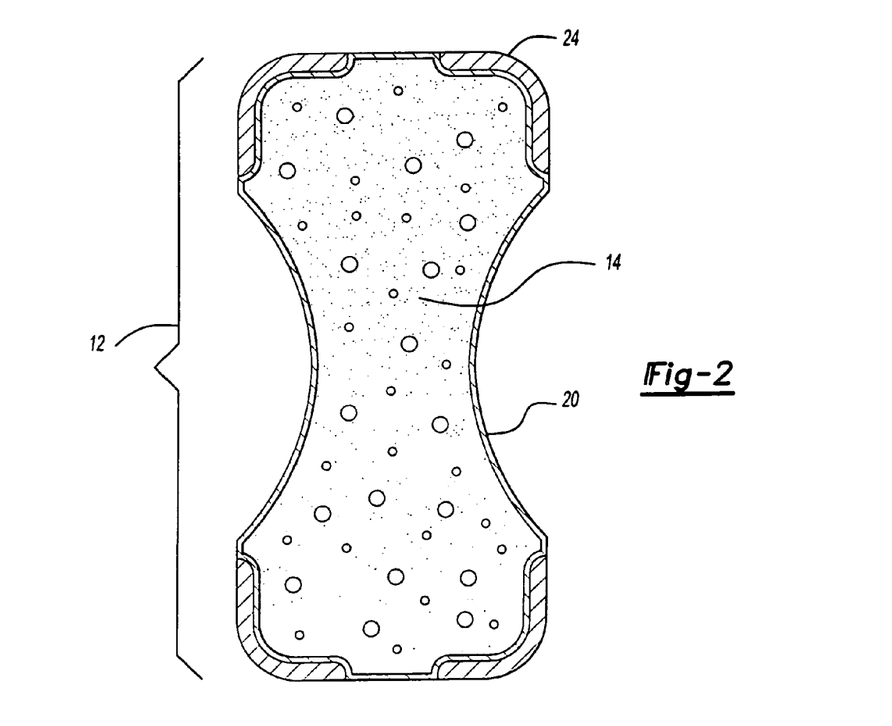
FIG. 2 shows an exploded cross-section of the hollow carrier reinforcement system formed in accordance with the teachings of this invention.
Figures 3, 4, 5:
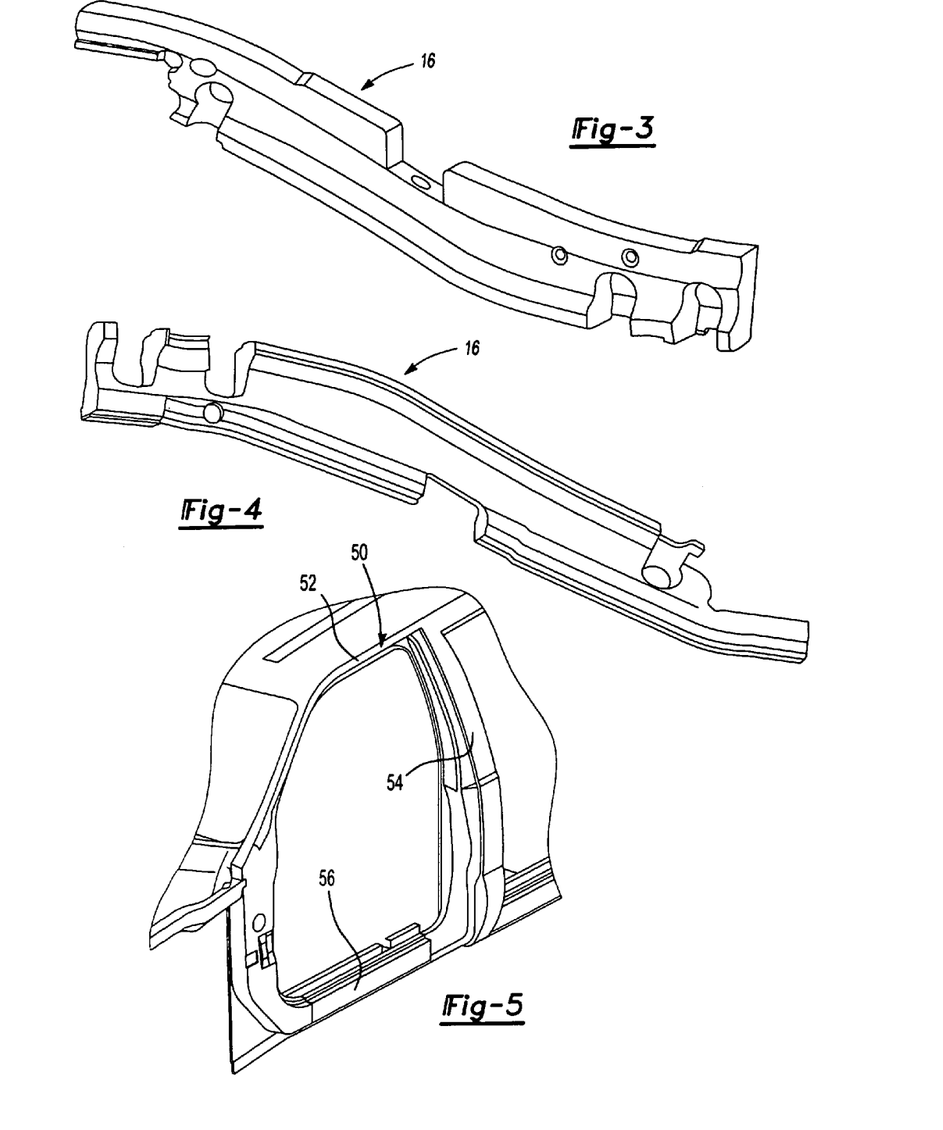
FIG. 3 illustrates the application of the hollow carrier system formed in accordance with the teachings of this invention placed within a structural member of an automotive vehicle.
FIG. 4 illustrates another view of the hollow carrier reinforcement system of the present invention placed and retained within a structural member of an automotive vehicle.
FIG. 5 illustrates a generic view of an automotive pillar adapted for receiving a reinforcement assembly of the present invention.

As shown in FIG. 2, the exterior surface or shell 20 of the carrier 12 can include an adhesive or bonding material 24 disposed along at least a portion of the exterior shell 20 of the carrier 12 having adhesion and bonding characteristics to allow the carrier 12, now filled with material 14, to be affixed, placed and adhered directly to the selected portion of the structural member 16 to be reinforced as shown in FIGS 3 and 4. The adhesive or bonding material 24 used to adhere the carrier 12 to the structural member 16 may be a heat activated structural material such as that commercially offered by L&L Products, Inc. of Romeo, Michigan, a pressure sensitive adhesive (PSA), or other bonding material suitable for adhering and affixing the carrier 12 to the chosen structural member 16 during the automotive manufacturing process. Alternatively, the exterior shell 20 of the carrier 12 may be made of a structural adhesive that is flexible, such that the carrier 12 itself would come into contact and adhere directly.

In the exemplary embodiment shown in FIG. 2. the carrier 12 is shaped to be placed within an automotive structural member 16. as discussed herein. However, in one particular application, the carrier may be placed within an automotive pillar member, such as the automotive pillar shown in FIG. 5. The carrier 12 includes material 14 forming a core of the carrier 12 (such as a polyurethane foam core or otherwise as described herein). Preferably, the core conforms and shapes to the geometry and dimensions of an interior portion of the automotive structural member 16. In the configuration shown, the core extends along a longitudinal axis and includes a first end and a second end. The core material further includes a pair of concave arcuate surfaces spaced about opposite sides of the longitudinal axis extending between the first and second ends of the core. Optionally, as with the embodiment shown in FIG. 1. the embodiment of FIG. 2 may further include one or more mechanical retention means 48 for attaching the carrier 12 to the automotive structural member 16. Located external to the core is a bonding material 24. Preferably, the bonding material is heat activatable and present over at least one of the first or second ends of the core material. In one preferred embodiment, upon application of heat, as described herein, the bonding material forms a heat activated foamed material which is present over one or more of the first and second ends of the core, and wherein the core material includes a central portion which is substantially free of an expanded material. The bonding material may be formed through extrusion methods and subseguently die cut or the like. Optionally, the core may include an exterior shell or surface 20 for forming a barrier layer between the core and the bonding material.

The above described embodiments of the carrier 12 merely illustrate the various forms in which the carrier can be constructed and used to reinforce structural members typically found in automotive, aerospace, and marine vehicles. One of ordinary skill in the art will appreciate that many other configurations and constructions of the barrier carrier 12 may be used in practicing the invention. For instance, the carrier 12 could be a reservoir for retaining the material 14 within defined portions of a structural member 16, or the carrier 12 could be used to meter/control flow of the material 14 past the boundary of the carrier 12 to allow the material 14 to come into contact and adhere with targeted areas of the inner portion of the structural member.

As set forth herein, the carrier 12 of the present invention can be a blow molded or rotational molded polymeric material such as an elastomer, polyethylene, ethylene-vinyl acetate copolymer, plasticized polyvinyl chloride film, polyamide, polysulfone, or various olfenic copolymer or terpolymer materials. One of skill in the art will appreciate that the system 10 can be used for a wide variety of applications for a variety of transportation and consumer related products that can benefit from structural reinforcement. Thus, the choice of material selected to comprise the carrier 12 will depend upon the environmental conditions under which the carrier 12 will be used, including how the carrier will be inserted and retained within the chosen structural member 16.

In a particular embodiment, the carrier 12 can be used to reinforce a portion of a structural member found in automotive vehicles, such as an automobile frame or rail, during initial assembly of the vehicle or in the automobile after market in body or paint shop applications during repair operations. For example, referring to FIG. 5, a generic view of an door assembly 50 of an automotive frame member 16 is shown.

The carrier 12 may be used to reinforce various portion of the door assembly 50 including a rail 52, pillar 54 or other frame portion 56. In the aforementioned applications, the carrier 12 can be exposed to temperatures ranging from approximately 93° C. (200° F.) to approximately 204° C. (400° F.). In still another embodiment, the carrier 12 can be used in low temperature operations, including applications at subzero temperatures. Thus, the material selected for forming the carrier 12 should possess thermal properties that will permit the carrier 12 to maintain its structural integrity at a predetermined temperature or over a predetermined temperature range.

One of skill in the art will also appreciate that the size and specific physical dimensions of the barrier compartment or carrier 12 will vary depending on the physical dimensions of the area to be reinforced.

Turning now to a discussion of the material 14 for use in the present invention, the material 14 can be any material that can be dispensed as a liquid, solid, or semi-solid material and later reacted or cured to create a substantially fused member. Further, the material of the present invention may comprise a rigid, low density material such as foamed polyurethane, epoxy, thermoplastic, ceramic, metallic, metallic foam, foamed concrete, or other material which may harden by curing, cooling, or some other method to produce a preferably lightweight, but rigid, interior defined within the inner portion of the carrier 12. The material 14 may further comprise a palletized form which can fuse together when exposed to heat sources typically encountered in automotive manufacturing operations. Other materials that can be used to form the material 14 include, but are not limited to, epoxy, polyurethane, polyester, and acrylic based materials, which when compounded with appropriate ingredients may expand and cure in a reliable and predictable manner upon application of a curing stimulus. One of skill in the art will appreciate that various olfenic materials, elastomers, fluropolymers or other materials may be used to formulate the material 14.

Although the material 14 of the present invention does not need to be either heat-activatable or expandable, a number of epoxy-based structural reinforcing foams are known in the art and may also be used to produce the material 14 of the present invention. A typical structural foam includes a polymeric base material, such as an epoxy resin or ethylene-based polymer which, when compounded with appropriate ingredients (typically a blowing agent, a curing agent, and perhaps a filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the structural foam is usually initially processed as a thermoplastic material before curing. After curing, the structural foam typically becomes a thermoset material that is fixed and incapable of flowing.

The material 14 may also comprise a heat-activated epoxy-based resin having foamable characteristics upon activation through the use of heat typically encountered in an e-coat or other automotive paint oven operation. As the material 14 is exposed to heat, it generally expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations L-5204, L-5206, L-5207, L-5208, L-5209, L-5214, and L-5222. One advantage of the preferred structural foam materials over prior art materials is the preferred materials can be processed in several ways. Possible processing techniques for the preferred materials include injection molding, blow molding, thermoforming, direct deposition of pelletized materials, extrusion, extrusion with a mini-applicator extruder, or heat bonding. This enables the creation of part designs that exceed the design flexibility capability of most prior art materials. In essence, any foamable material that imparts structural reinforcement characteristics may be used in conjunction with the present invention. The choice of the material used 14 will be dictated by performance requirements and economics of the specific application and requirements and may not necessarily include a heat-activated expandable material. Generally speaking, these automotive vehicle applications may utilize technology and processes such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000, Ser. No. 09/524,961 filed Mar. 14, 2000, No. 60/223,667 filed Aug. 7, 2000, No. 60/225,126 filed Aug. 14, 2000, Ser. No. 09/676,443 filed Sep. 29, 2000, Ser. No. 09/676,335 filed Sep. 29, 2000, Ser. No. 09/676,725 filed Sep. 29, 2000, and particularly, Ser. No. 09/459,756 filed Dec. 10, 1999, all of which are expressly incorporated by reference.

Additional foamable or expandable materials that could be utilized in the present invention include other materials which are suitable as bonding, energy absorbing, or acoustic media and which may be heat activated foams which generally activate and expand to fill a desired cavity or occupy a desired space or function when exposed to temperatures typically encountered in automotive e-coat curing ovens and other paint operation ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foamable material may comprise an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foamable formulations commercially available include polymer-based materials available from L&L Products, Inc. of Romeo, Mich., under the designations as L-2018, L-2105, L-2100, L-7005, L-7101, L-7102, L-2411, L-2420, L-4141, etc. and may comprise either open or closed cell polymeric base material.

Further, it is contemplated that the material 14 of the present invention may comprise acoustical damping properties which, when activated through the application of heat, can also assist in the reduction of vibration and noise in the overall automotive chassis, frame, rail, and/or body of the vehicle. In this regard, the now reinforced and vibrationally damped frame or front rail will have increased stiffness which will reduce natural frequencies, that resonate through the automotive chassis thereby reducing transmission, blocking or absorbing noise through the use of the conjunctive acoustic product. By increasing the stiffness and rigidity of the frame or front rail, the amplitude and frequency of the overall noise/vibration that occurs from the operation of the vehicle and is transmitted through the vehicle can be reduced.

Although the use of such impact absorbing materials and members are directed to structural members such as an automotive frame or rail, it is contemplated that the present invention can be utilized in other areas of an automotive vehicles that are used to ensure ingress and egress capability to the vehicle by both passengers as well as cargo, such as closures, fenders, roof systems, and body-in-white (BIW) applications which are well known in the art.

In applications where a heat activated, thermally expanding material is employed, an important consideration involved with the selection and formulation of the material comprising the structural foam is the temperature at which a material reaction or expansion, and possibly curing, will take place. In most applications, it is undesirable for the material to activate at room temperature or the ambient temperature in a production line environment. More typically, the structural foam becomes reactive at higher processing temperatures, such as those encountered in an automobile assembly plant, when the foam is processed along with the automobile components at elevated temperatures. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, various blowing agent activators can be incorporated into the composition to cause expansion at different temperatures outside the above ranges.

Generally, prior art expandable acoustic foams have a range of expansion ranging from approximately 100 to over 1000 percent. The level of expansion of the material may be increased to as high as 1500 percent or more, but is typically between 0% and 300%. In general, higher expansion will produce materials with lower strength and stiffness properties.

It is also contemplated that the material 14 could be delivered and placed into contact with the carrier 12 of the present invention through a variety of delivery systems which include, but are not limited to, pumpable systems, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In another embodiment, the material 14 is provided in an encapsulated or partially encapsulated form, which may comprise a pellet, which includes an expandable foamable material, encapsulated or partially encapsulated in an adhesive shell, which could then be attached or deposited within the carrier 12 in a desired configuration. An example of one such system is disclosed in commonly owned, co-pending U.S. application Ser. No. 09/524,298 ("Expandable Pre-Formed Plug"), hereby incorporated by reference. In addition, preformed patterns may also be employed such as those made by extruding a sheet (having a flat or contoured surface) and then die cut in accordance with a predetermined configuration.

Once introduced and placed within the carrier 12, the material 14 found in the present invention can be cured by reacting two or more materials that possess chemically reactive functional groups. As discussed above, reaction can also be achieved by heating the material 14 to a desired temperature, heating the material 14 over a desired temperature range or by exposing the material 14 to a predetermined change in ambient conditions. For example, the material 14 can be cured by an induction heating application or by exposure to ambient conditions resulting in a change in atmospheric moisture conditions. In one embodiment, the material 14 can be a thermally activated compound such that it expands upon exposure to a predetermined temperature.

As the material 14 is cured, typically it expands to fill the area, or at least a portion of the area, to which it has been applied, in this case the carrier 12 of the present invention. Although this expansion provides structural benefits, it is not necessary. Since the material 14 can be cured or caused to become chemically reactive upon exposure to certain environment and ambient conditions, an important consideration in selecting and formulating the material comprising the material 14 is the temperature at which a chemical reaction or expansion, and possibly curing will take place. For instance, in most applications, it is undesirable for the material 14 to become reactive unless triggered by combination of reactive components, application of heat, etc. As previously discussed, the expandable material 14 can be used in an automobile assembly plant or a body shop where it can be exposed to temperatures typically ranging from approximately 93° C. (200° F.) to approximately 204° C. (400° F.).

Upon curing, the strength and stiffness of the material 14 are increased and the material is no longer capable of flowing. The strength and stiffness of the cured material help to increase the structural properties of article retaining the expandable material 14 without significantly adding to the overall weight of the article. Additionally, in the cured state, the material 14, can have a density that does not add significantly to the weight of the article being reinforced.

Use of the Barrier and Chamber System

The system 10 of the present invention can be used to reinforce a structural member or other space or portion of an automotive, aerospace or marine vehicle. Where the system 10 is used with a structural member 16 having a closed center, the method for using the system 10 can include supporting at least one carrier 12 having an exterior shell or surface 20 and an inner portion or interior cavity 22 defining a volume or space along a portion of the structural member 16 and filling the interior cavity 22 of the carrier 12 with a material 14 through at least one access hole or port 30 located on the exterior surface 20 of the carrier 12. An adhesive material 24 is then applied along at least a portion of the exterior surface 20 of the carrier 12 so that the carrier 12, now filled with the material 14, can be placed and affixed directly to the portion of the structural member 16 selected for targeted structural reinforcement, noise/vibrational damping, sealing, stress-strain reduction, or a combination thereof. combination thereof.

The material 14 can be filled, pumped, or injected, using known techniques, into the interior cavity 22 of the carrier 12 through the access hole or port 30. Alternatively, the material 14 may be placed or disposed within the carrier 12 prior to placement of carrier 12 within the structural member 16. The material 14, in liquid or pellet form, is filled into the interior cavity 22 of the carrier 12. The exterior shell 20 of the carrier 12 is suitable for receiving an adhesive or bonding material 24 along at least a portion of the exterior shell 20 to allow the carrier to be directly affixed to the structural member 16.

In any of the embodiments discussed above, it will also be appreciated by one of skill in the art that it is possible that the reaction exotherm of the material 14 during the curing process could the exterior shell 20 of the carrier 12 to melt thereby allowing the material 14 to either bond directly to the inner surface of the structural member 16 or displace to permit adhesion of the material 14 directly to the chosen structural member 16.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A reinforcement assembly of an automotive structural member comprising:
    a polyurethane foam core having a pair of concave arcuate surfaces spaced about opposite sides of a longitudinal axis extending between a first end and a second end of the polyurethane foam core:
    a heat activated foamed material located external of the polyurethane foam core and being present over at least one of the first end or the second end; and
    wherein a central portion of the polyurethane foam core is substantially free of an expanded material.

2. The reinforcement assembly of claim 1, further including one or more mechanical retainers for locating the foam core within the structural member.

3. The reinforcement assembly of claim 1, wherein prior to installation of the polyurethane foam core within an automotive structural member the polyurethane foam core includes a hollow portion.

4. The reinforcement assembly of claim 1, wherein the heat activated foamed material is extruded and die cut.

5. The reinforcement assembly of claim 1, further comprising a barrier layer located between the heat activated foamed material and the foam core.

6. The reinforcement assembly of claim 5, wherein the heat activated foamed material is bonded directly to the barrier layer prior to foaming.

7. The reinforcement assembly of claim 1, wherein the structural member being reinforced is an automotive pillar.

8. The reinforcement assembly as defined in claim 1, wherein the foam core includes an epoxy.

9. The reinforcement assembly as defined in claim 1, wherein the foam core conforms in shape to the geometry and dimensions of an interior portion of the structural member.

10. The reinforcement assembly as defined in claim 1, wherein the heat activated foamed material bonds to the structural member during an automotive paint operation.

11. The reinforcement assembly as defined in claim 1, wherein the heat activated foamed material is present over more than one end of the foam core.

12. The reinforcement assembly as defined in claim 1, further comprising one or more mechanical retainers for locating the foam core within the structural member, and wherein the foam core conforms in shape to the geometry and dimensions of an interior portion of the structural member.

13. The reinforcement assembly as defined in claim 12, wherein the foam core includes a barrier layer in which the heat activated foamed material is bonded directly thereto.

14. The reinforcement assembly as defined in claim 12, wherein the heat activated foamed material is an extruded and die cut adhesive that bonds the foam core to the structural member during an automotive paint operation.

15. The reinforcement assembly as defined in claim 14, wherein the heat activated foamed material is present over more than one end of the foam core.

16. The reinforcement assembly of claim 15, wherein the structural member being reinforced is an automotive pillar.

17. A reinforcement assembly of an automotive pillar member comprising:
    a polyurethane foam core having a pair of concave arcuate surfaces spaced about opposite sides of a longitudinal axis extending between a first end and a second end of the polyurethane foam core:
    a heat activated foamed material located external of the polyurethane foam core and being present over at least one of the first end or the second end, wherein a central portion of the polyurethane foam core is substantially free of an expanded material and wherein the heat activated foamed material is extruded and die cut and bonds to the pillar member during an automotive paint operation; and
    one or more mechanical retainers for locating the foam core within the pillar member, wherein the foam core conforms in shape to the geometry and dimensions of a pillar member.

* * * * *